No. 815,724. PATENTED MAR. 20, 1906.
C. R. MARTINEAU.
ADDING DEVICE FOR TYPE WRITING MACHINES.
APPLICATION FILED DEC. 3, 1902.
7 SHEETS—SHEET 3.
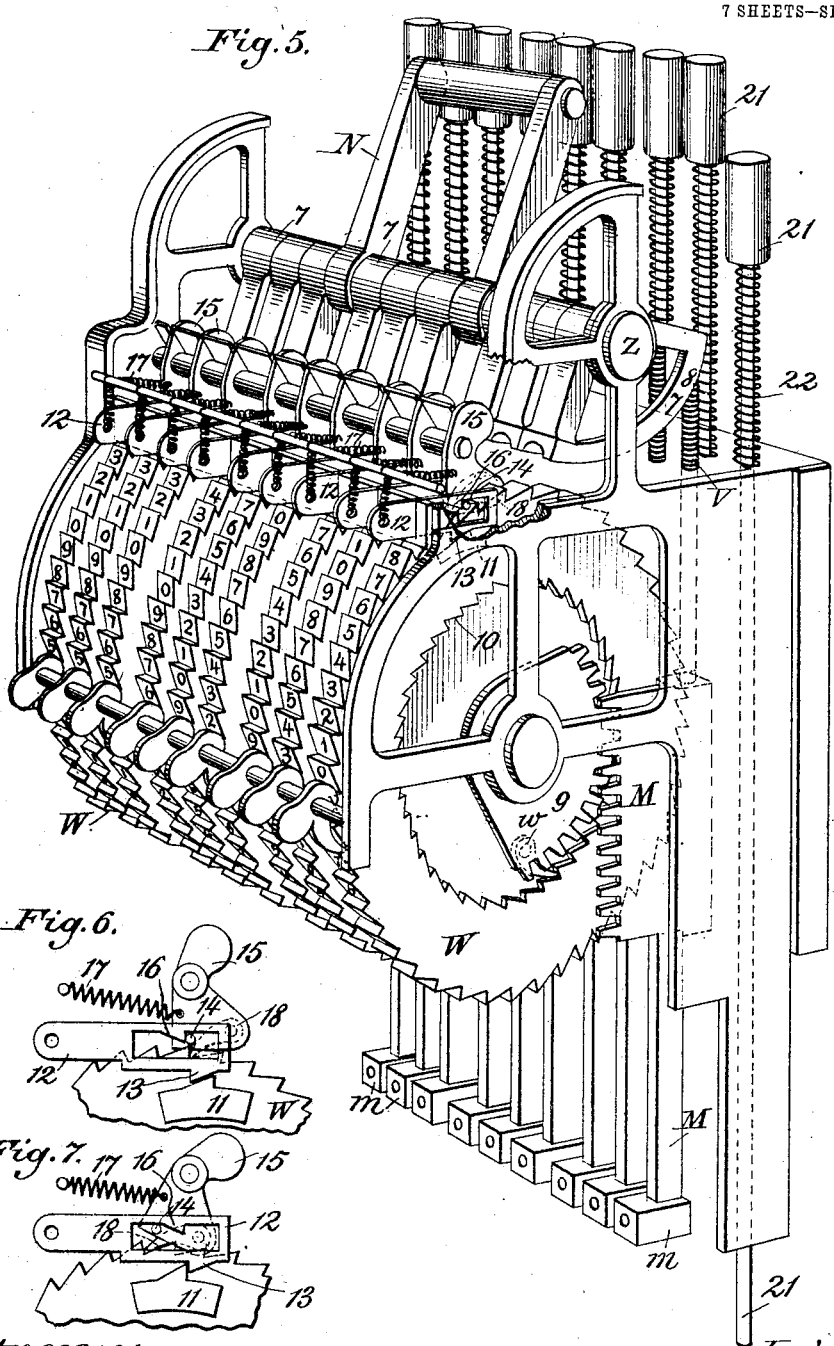
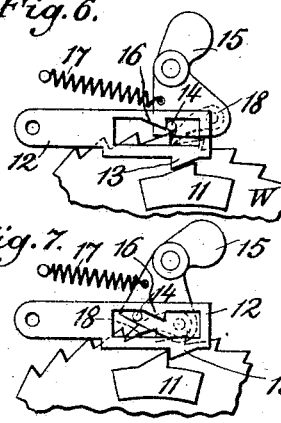
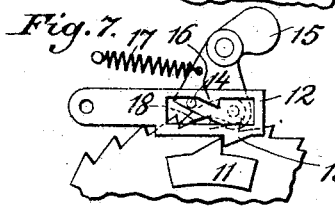
Witnesses:
Inventor:
Clarence R. Martineau,
by Ward Cameron,
Attys.

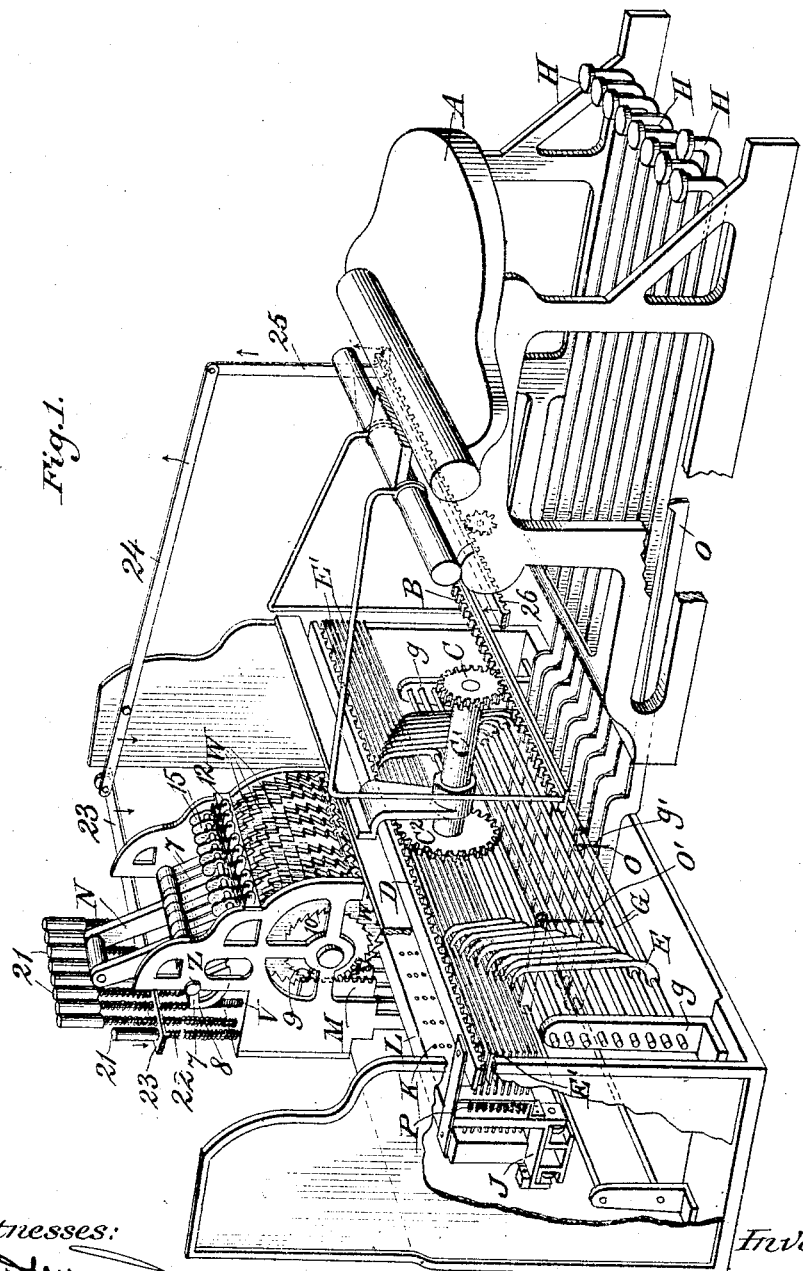

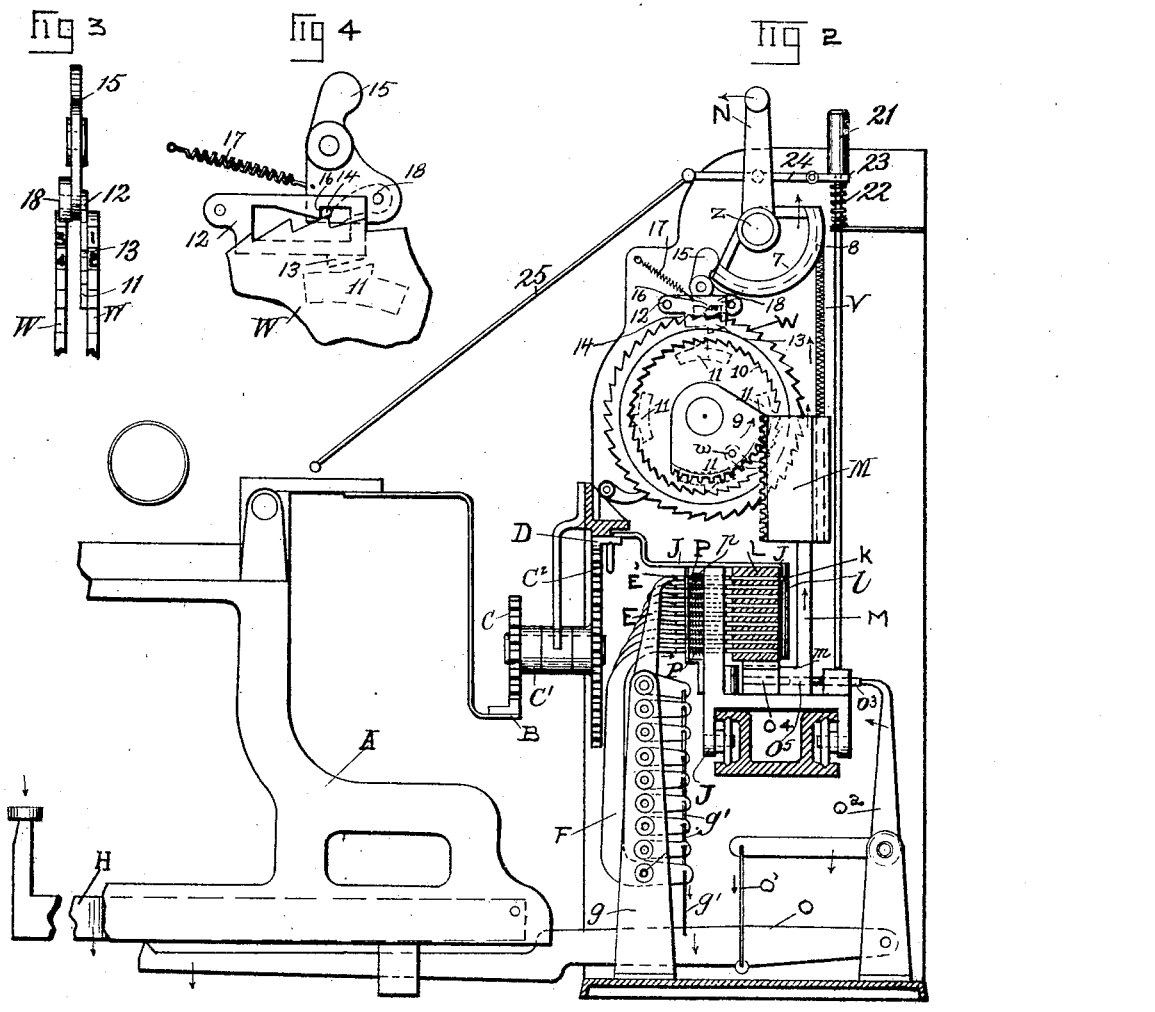

No. 815,724. PATENTED MAR. 20, 1906.
C. R. MARTINEAU.
ADDING DEVICE FOR TYPE WRITING MACHINES.
APPLICATION FILED DEC. 3, 1902.
7 SHEETS—SHEET 4.
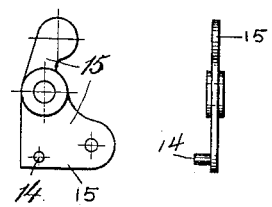
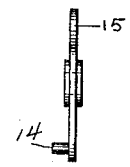
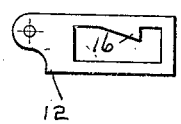
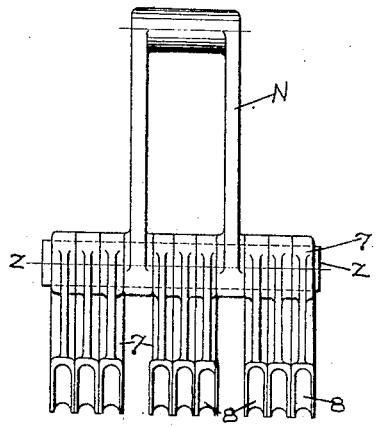
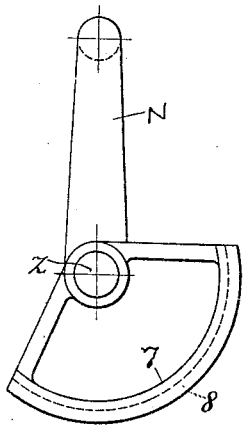
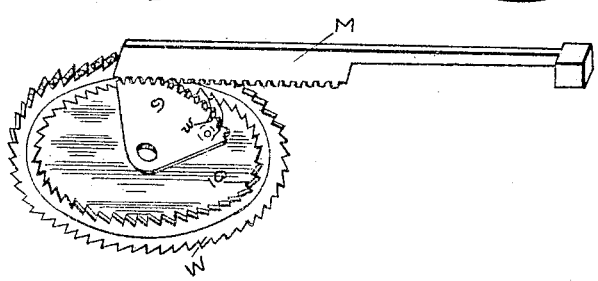
WITNESSES
Lottie Prior
Julia Crain
INVENTOR
Clarence R. Martineau
BY Ward & Cameron.
Attorneys No. 815,724. PATENTED MAR. 20, 1906.
C. R. MARTINEAU.
ADDING DEVICE FOR TYPE WRITING MACHINES.
APPLICATION FILED DEC. 3, 1902.

7 SHEETS—SHEET 5.

WITNESSES
INVENTOR
Clarence R. Martineau
BY Ward Cameron
Attorneys

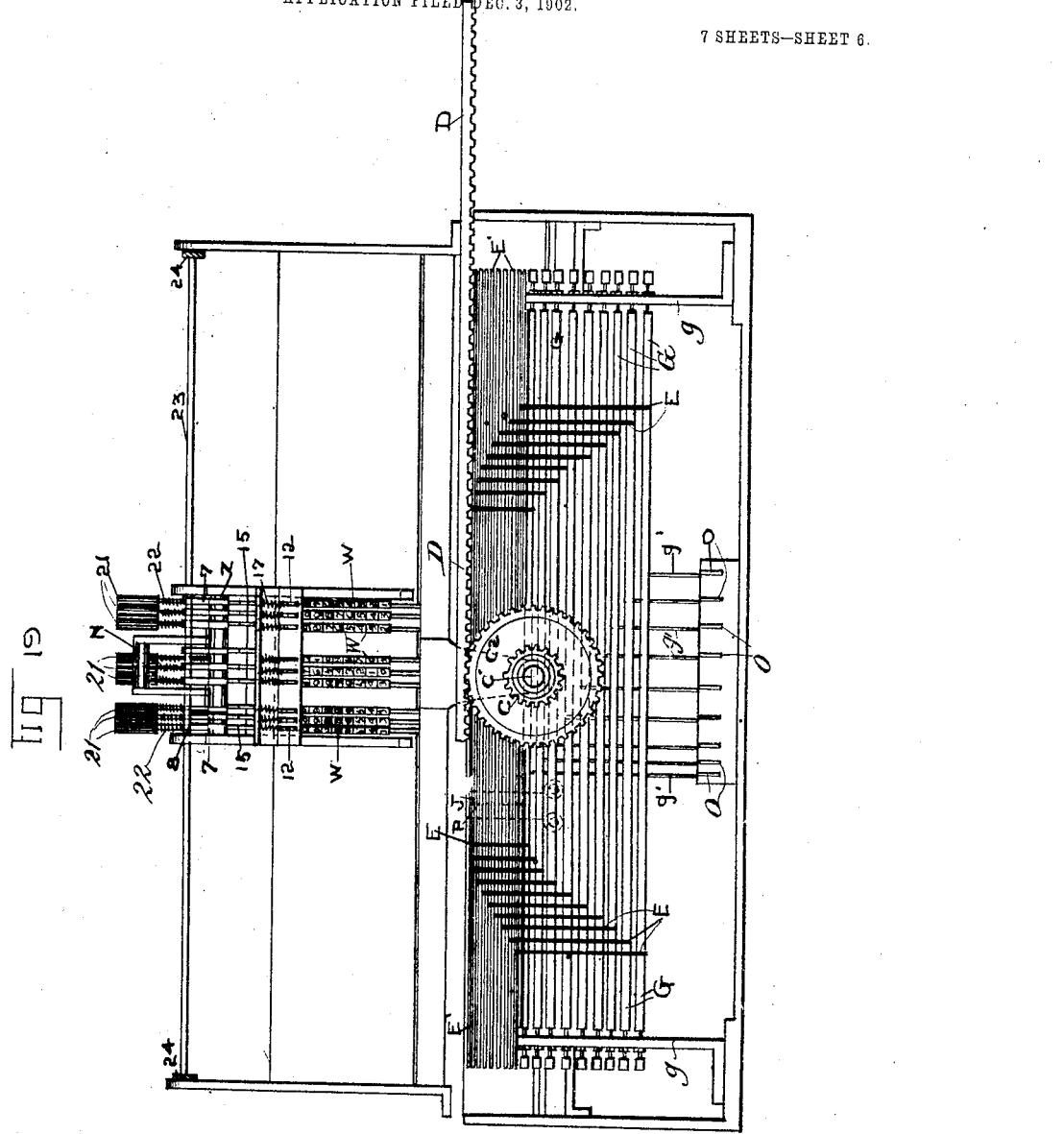

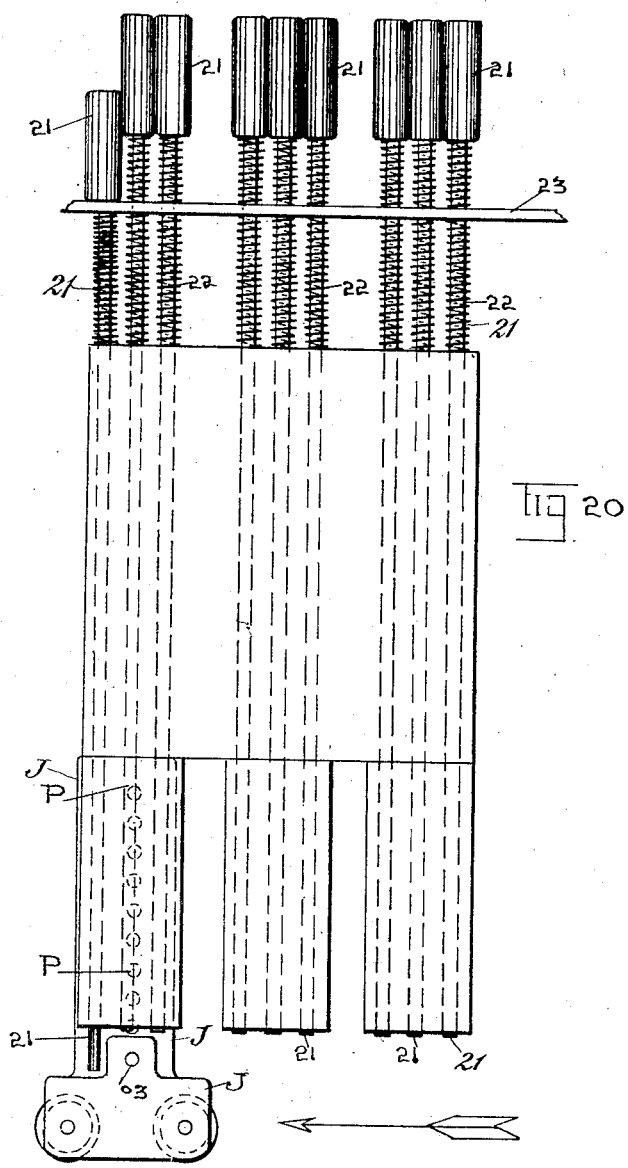

UNITED STATES PATENT OFFICE.

CLARENCE R. MARTINEAU, OF ALBANY, NEW YORK, ASSIGNOR TO TYPE-WRITER ADDING MACHINE COMPANY, A CORPORATION OF NEW YORK.

ADDING DEVICE FOR TYPE-WRITING MACHINES.

No. 815,724.     Specification of Letters Patent.     Patented March 20, 1906.

Application filed December 3, 1902. Serial No. 133,651.

*To all whom it may concern:*

Be it known that I, CLARENCE R. MARTINEAU, a citizen of the United States of America, and a resident of the city and county of Albany and State of New York, have invented certain new and useful Improvements in Adding Devices for Type-Writing Machines, of which the following is a specification.

My invention relates to adding devices arranged to be attached to a type-writer.

The object of my invention is to cause the number when struck by the type-writer operator to be tabulated and added by an attachment secured to the type-writer. I attain this object by means of the mechanism illustrated in the accompanying drawings, in which—

Figure 16:
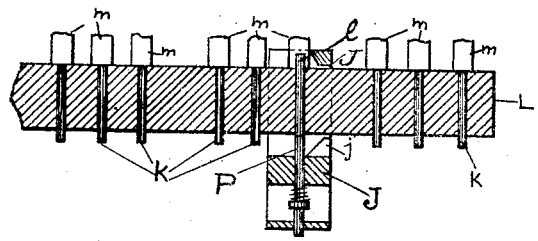
Figure 15:
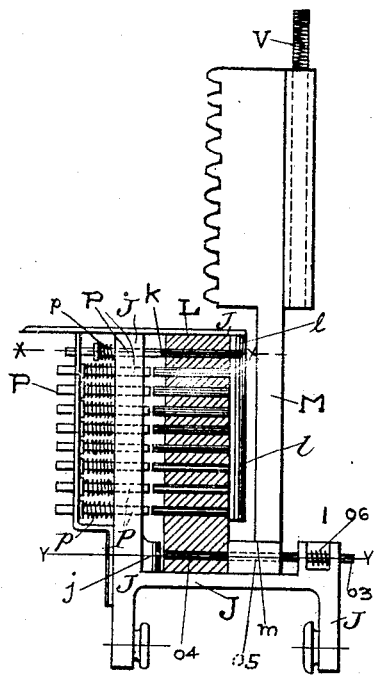
Figure 17:
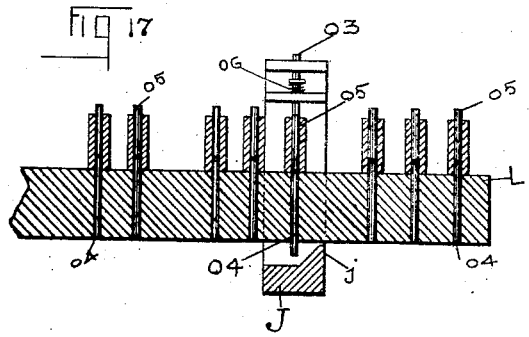
Figure 18:
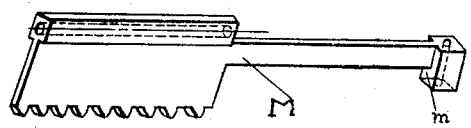

Figure 1 is a perspective view showing the attachment in connection with a type-writer. Fig. 2 is a section. Fig. 3 is a front elevation of a portion of the adding-wheels. Fig. 4 is a side elevation of Fig. 3. Fig. 5 is a perspective view of the adding-wheels and rack. Fig. 6 is a perspective view of one of the adding-wheels, showing the connection of the bell-crank lever 15 with the adding-wheel. Fig. 7 is a detail perspective view showing the connection between the bell-crank lever 15, the latch 12, and the lift 11, illustrating the means of making the "carry." Fig. 8 is a plan view of the bell-crank lever 15. Fig. 9 is an end view thereof. Fig. 10 is a plan of the latch 12. Fig. 11 is an end view of said latch. Fig. 12 is a perspective view of rack and adding-wheel. Fig. 13 is a plan of the segments 7 and their handle N. Fig. 14 is a side elevation of Fig. 13. Fig. 15 is a detail view, partly in section, showing the side elevation of the pins in the carriage and pins in the nest, illustrating the manner of operating them in connection with the rack. Fig. 16 is a cross-section along the lines X X, Fig. 15. Fig. 17 is a cross-section along the lines Y Y, Fig. 15. Fig. 18 is a perspective view of the rack. Fig. 19 is an enlarged front elevation of the entire adding mechanism. Fig. 20 is a rear elevation of the adding mechanism.

Similar letters and numerals refer to similar parts throughout the several views.

A represents a type-writing machine. Connected with its carriage by means of suitable straps I secure a rack B, engaging with a pinion C, which pinion is on a spindle C', upon which spindle is mounted the wheel $C^2$, which engages with the rack D, attached to the carriage of the adding device. By this means as the type-writer carriage moves to the left the carriage of the adding-machine will move to the right.

For the purpose of limiting the rotation of the adding - wheels, hereinafter to be described, and determining the position in which they shalll stop rotation and register the desired figures I arrange a nest of pins, preferably in six columns, each column having nine, one above the other, the number of columns depending upon the number of adding-wheels employed. I therefore show a nest L in Figs. 2, 15, 16, and 17, in which the pins K, arranged to be operated upon, are illustrated. For the purpose of arranging for operating the desired pins K contained in the nest L, I arrange in the carriage J a series of pins P, similar to the pins K, in such a manner that when one of the pins P is pressed in, as shown in Figs. 2 and 15, a corresponding pin K of the nest L will be pressed forward within the path of the shoulder m on the end of the rack M, as shown in Figs. 2 and 15.

For the purpose of operating the pins P and causing them to act upon the pins K for the purpose of projecting the said pins K into the path of the racks M, I arrange a series of narrow thin plates or rods E', extending across the adding-machine from one side to the other, each of said plates E' supported and operated by the arms E, said arms mounted upon rods G, said rods supported in posts g, attached to the sides of the machine, respectively, each of said arms E provided with projections extending to the rear of said posts g, said projections connected, by means of links g', to pivoted levers O, which pivoted levers are acted upon by the keys of the type-writing machine, as hereinafter more particularly described. It will be understood that in the device as illustrated there are nine plates E' and nine rods G, supported as shown in Fig. 2. As thus mounted when the bars of the type-writing machine which indicate the numbers desired are depressed the corresponding arms E will be acted upon, causing the plate E' to engage with the corresponding pins P.

On each of the pins P, I preferably arrange a spring p, so adjusted on the pin that when the pin is pressed on by one of the plates E' the spring will be compressed, and after pressure has been removed the pin under the influence of the spring will be restored to its normal position.

In order to return the pins K in the nest L to their places within the nest, respectively, after the operation of the adding-wheels, I arrange on the carriage a flange $l$ in such a manner that as the carriage is returned the flange $l$ will press back each of the pins K which have been forced by the pins P into the path of the rack-shoulder $m$.

For the purpose of holding the rack M in position with its shoulder $m$ below the nest of pins L, I arrange a series of three pins $O^3$, $O^4$, and $O^5$, preferably. $O^4$ is a pin in the block containing the nest L (shown in Figs. 2, 15, and 17) and which normally extends into the shoulder $m$ at the end of the rack M, as shown in Fig. 17. $O^5$ is a short pin placed in the shoulder $m$. Pin $O^3$ is placed in the carriage J in the rear of the racks M. I preferably arrange a spring $O^6$ on the pin $O^3$, adapted to return the pin $O^3$ to its normal position after having been operated upon.

It is apparent that before the rack M can be moved it is necessary to drive out pin $O^4$, which holds the rack in position below the nest L. To accomplish this result, I have arranged a lever O, properly fulcrumed at one end thereof beneath the rear of the rack M, the other end adapted to be operated on by the keys of the type-writing machine. I mount the bell-crank lever $O^2$ preferably above and in the same vertical plane as is the pivoted end of the lever O, as shown in Fig. 2. One arm of the bell-crank lever is attached to the lever O. The other arm is provided with a finger at its end and arranged to engage with the pin $O^3$. As thus constructed and mounted up when the lever O is acted upon by the type-writing machine the pin $O^3$ acts upon the pin $O^5$ in the shoulder $m$ of the rack M and forces the pin $O^5$ out of said shoulder, and therefore liberates the rack M. In order to drive back the pin $O^4$ and the pin $O^5$, I arrange on the carriage J a flange $j$, which, with the return movement of the carriage, will force the pins $O^4$, and therefore the pins $O^5$, into their normal position.

The racks M are respectively connected preferably with the segmental wheels 7 by means of spiral springs V. Each segment is preferably provided with a groove 8, within which the spiral spring V engages. Each segment of the wheel 7 is mounted on rod Z and is attached to the handle N in such a manner that by the movement of the handle the segment will be partially rotated, whereby the rack M will be moved vertically against the tension of the spring V, the spring being raised by said movement of the segment.

The racks M engage with the segment 9, mounted on the spindle carrying the adding-wheels W. On the face of the segment 9 adjacent to the wheel W is mounted the dog $w$, which engages with the teeth of the annular rack 10 on the face of the wheel W. The dog is so placed in reference to the teeth of the rack 10 that as the rack M moves upward under the influence of the segment-wheel 7 it will engage with the teeth of the annular rack and cause the wheel W to rotate. As the extent of the rotation of the wheels W is limited by the height to which the rack M is raised, it is apparent that the location of the pins K, forced out of the nest L, will determine the position in which the wheel W will be at the end of its revolution. The figures on the periphery of the adding-wheel in the place of registration will correspond with the figures on the keys of the type-writer which were operated on and by which operation pins K are placed in the path of the shoulder $m$ of the rack M.

In order to provide for the carry which takes place when the addition passes ten, hundred, &c., requiring the next wheel on the left to add one for the carry, I place on the face of the wheel W, adjacent to the next adjoining adding-wheel, a lift 11 in a position adjacent to the zero-point on the periphery of the wheel to which it is attached. I mount a latch 12 adjacent to and between the wheels, respectively, provided with a projection 13, which will engage with the lift 11 when the wheel W has reached the zero on the periphery. The projection 13 on the latch 12 when it engages with the lift 11 will raise the latch and liberate a pin 14 on the bell-crank lever 15, which is held in connection therewith by the projection 16 on the latch 12. The bell-crank lever 15 carries a pawl 18, which engages with the teeth on the periphery of the next adjacent adding-wheel on the left. When the latch 12 is lifted under the influence of the lift 11 and the bell-crank lever is liberated, the pin 14 coming out of engagement with the latch 12, the spring 17, attached to said bell-crank lever, will move the bell-crank lever, and therefore the pawl 18, forward, and thus move the wheel with which the pawl 18 engages one space, which will make the carry. In order to reset the bell-crank lever 15 in contact with the latch 12, and thus prepare for the next carry, the bell-crank lever 15 has one of its arms within the path of the segment-wheel 7, and as the handle N, attached to said segment-wheel, is operated the arm of the bell-crank lever will be pushed forward against the tension of the spring 17, and the pin 14 will engage with the projection 16 on the latch 12 and will be held in position thereby until the latch 12 is operated again by the lift 11.

The operation of my machine is as follows: I strike the keys on the type-writer corresponding to the figures which I wish to appear on the paper. The type-writing machine will print the figures in the usual manner. As the different keys are struck the pins P corresponding thereto in the carriage will drive the pins K in the nest into the path of the racks, respectively. At the same time each of the pins O³ in the shoulder m will be driven in and retaining-pins O⁴ driven out of contact with the said shoulder on the end of the rack, thus releasing each rack within the path of which one of the pins from the nest has been projected, each of the other racks being held by their retaining-pins, respectively. The handle N is drawn forward and downward by the operator. The segment-wheels 7 are consequently rotated, and the racks that are released are raised as far as they can go, being stopped, respectively, by the pins K, which have been projected into the path of their movement. The result will be that each of the wheels will be stopped in the position which will bring the numbers on their peripheries corresponding with the numbers struck on the keys of the type-writing machine in the place of registration immediately before the operator. It will be noticed that in the movement of the handle N all of the segment-wheels 7 will be caused to rotate, but not all of the racks will be raised, for the reason hereinbefore stated, the spiral spring V, attached to each rack, permitting of this movement of the segment-wheels when the racks are held stationary. In order to place the racks in their normal position ready for the next operation of the machine, I release handle N. The racks will fall back, the shoulders will be returned immediately and secured in their places by means of the pins O⁴, which will by the movement of the carriage be forced into position within the shoulder, and the machine be ready for operation. When the next line of figures is placed beneath the first, the operation is repeated, and the addition—that is, the sum of the two lines of figures—will be recorded on the face of the wheels.

For the purpose of tabulating I have arranged in the rear of the adding device a series of columnating-rods 21, which are arranged vertically and normally held elevated by a series of springs 22. Each rod is preferably provided with a spring, one end of which spring rests upon the frame of the machine and at the other end engages with the lower portion of the enlarged head of the rod. Extending across from one side of the series of tabulators to the other I arrange a bar 23, which is so placed in reference to the columnating-rods 21 that when the said rods or any of them are depressed, as is shown at the extreme left of Fig. 20, the enlarged head of the rod will engage with the bar 23 and draw the bar downward. For this purpose I may have the bar 23 placed on the rods 21—that is, the rods may be passed through suitable openings in the bar. The bar 23 is connected with the lever 24, which is supported at the side of the machine, the opposite end of said lever being connected with an arm 25, which passes beneath the carriage of the type-writing machine, as shown by dotted lines in Fig. 1. Thus when the lever 24 is operated by the bar 23 the arm 25 will be raised, which will raise the type-writer rack 26 out of connection with its actuating-pinion (not shown) and will free the carriage, which will immediately under the tension of the springs actuating it be caused to move, the direction of the movement of the adding-device carriage being shown by arrow in Fig. 20. The adding-machine carriage will be stopped in its movement by the end of the depressed columnating-rod 21. By this means the adding mechanism will be set so that the figures registered by the type-writing machine shall be in their proper position. It is understood, of course, that the columnating-rods may be acted upon as occasion requires and that after they have been depressed they will, under the influence of the springs 22, be returned to their normal position.

What I claim as my invention, and desire to secure by Letters Patent, is—

1. In an adding device adapted to be attached to a type-writing machine, a carriage; a means for connecting said carriage with the carriage of the type-writing machine, whereby the carriage will be caused to move in the opposite direction to the movement of the carriage of the type-writing machine; a series of wheels; a series of racks adapted to engage with said wheels, respectively; a lever; a pin; a means for causing said pin to be placed in the path of one of said racks by the operation of the type-writing machine, substantially as described.

2. In an adding device for type-writing machine, the combination of a carriage; a means for connecting said carriage with the carriage of the type-writing machine, whereby the carriage of the adding device will be moved in a direction opposite to that of the type-writing-machine carriage; a series of adding-wheels; a series of racks arranged to engage said wheels, respectively; a series of pins; a means for causing one or more of said pins to project in the pathway of the racks, aforesaid, whereby the movement of rotation of said adding-wheels will be limited; a lever attached to and adapted to operate the racks, substantially as described.

3. In an adding device adapted to be attached to a type-writing machine; a carriage; a means for connecting said carriage with the carriage of the type-writing machine, whereby the carriage will be caused to move in the opposite direction to the movement of the carriage of the type-writing machine; a series of wheels; a series of racks adapted to operate said wheels, respectively; a series of lifts placed on the faces of said wheels, respectively, adjacent to the zero-point indicated on the periphery of the wheels; a series of latches adapted to engage said lifts, respectively; a bell-crank lever; a means for operating said bell-crank lever by said latch; a pawl connected with said bell-crank lever adapted to engage one of said wheels whereby the carry is made; a lever; a series of pins; a means for causing one of said pins to be placed in position to limit the movement of said racks by the operation of the type-writing machine, substantially as described.

4. In an adding device adapted to be attached to a type-writing machine; a carriage; a means for connecting said carriage with the carriage of the type-writing machine, whereby the carriage will be caused to move in the opposite direction to the movement of the carriage of the type-writing machine; a series of adding-wheels; a series of racks adapted to operate said wheels, respectively; a carry device placed in connection with said wheels, respectively, consisting of a lift attached to the face of each wheel adjacent to its zero-point; a latch; a pin; a bell-crank lever and a pawl; a lever; a means for limiting the movement of said racks by the operating of the type-writing machine, substantially as described.

5. In an adding device adapted to be attached to a type-writing machine; a carriage; a means for connecting said carriage with the carriage of a type-writing machine, whereby the carriage will be caused to move in the opposite direction to the movement of the carriage of the type-writing machine; a series of adding-wheels; a series of racks adapted to operate said wheels, respectively; a tabulating device consisting of a series of columnating-rods; a lever; an arm connected with said lever adapted to engage with the rack of the carriage of the type-writing machine; a bar connected with said lever placed in such a position that by the depression of either of the columnating-rods the typewriter-carriage rack will be raised, causing the carriage of the adding-machine to move until stopped by said columnating-rod.

Signed at Albany, New York, this 26th day of November, 1902.

CLARENCE R. MARTINEAU.

Witnesses:
FREDERICK W. CAMERON,
LOTTIE PRIOR.